March 18, 1924.
J. H. HAMMOND, JR
1,486,885
RADIODYNAMIC DUPLEX SYSTEM
Original Filed July 30, 1915
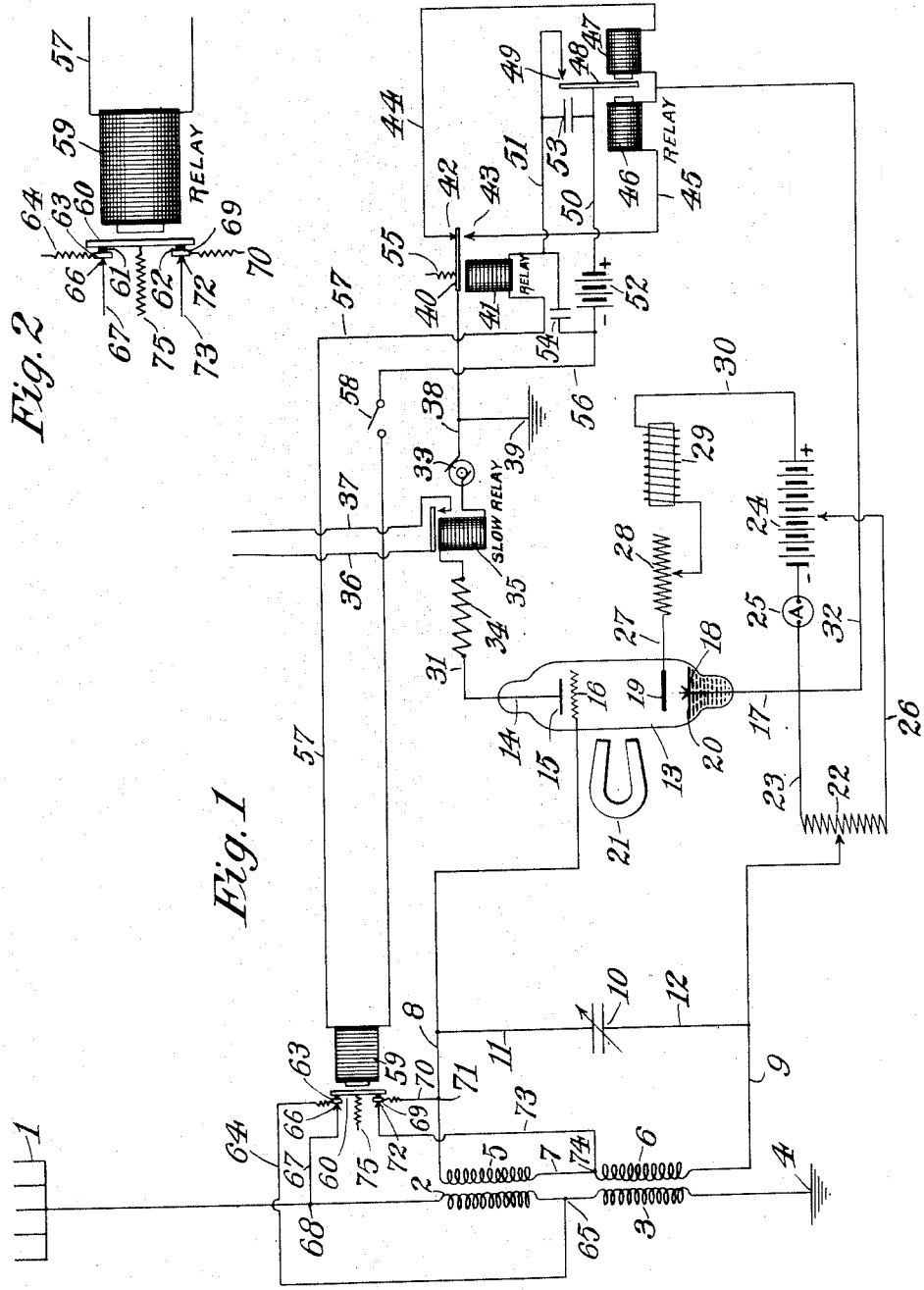
Witnesses:
Inventor
John Hays Hammond, Jr.
By his Attorney
A. Irwin Gardner Patented Mar. 18, 1924.

1,486,885

UNITED STATES PATENT OFFICE.

JOHN HAYS HAMMOND, JR., OF GLOUCESTER, MASSACHUSETTS.

RADIODYNAMIC DUPLEX SYSTEM.

Application filed July 30, 1915, Serial No. 42,848. Renewed July 24, 1923.

*To all whom it may concern:*

Be it known that I, JOHN HAYS HAMMOND, Jr., a citizen of the United States, and resident of Gloucester, in the county of Essex and State of Massachusetts, have invented certain new and useful Improvements in Radiodynamic Duplex Systems, of which the following description, in connection with the accompanying drawings, is a specification, like characters on the drawings representing like parts.

This invention relates primarily to means, systems and methods for controlling electric currents in receiving stations operated by radiant energy for the purpose of receiving or recording signals or messages or for controlling mechanisms or instrumentalities, or for other purposes. The invention also relates to means, systems and methods for operating functioning mechanisms or other instrumentalities at a receiving station of radiant energy.

In order that the principle of the invention may be readily understood, I shall describe one embodiment of means for practicing the same and shall disclose it in connection with a system for operating or controlling one or more mechanisms from a distance, it being understood that the invention may be embodied in widely differing systems for widely different purposes.

It has heretofore been proposed to provide means whereby the receipt of electromagnetic waves or impulses having a certain characteristic causes a change in the electrical value or constants of such circuit, so that it is then responsive only to certain other impulse characteristics. An important object of the present invention is broadly to provide means and to construct and operate a receiving circuit in such manner that the successive or combined influence or cooperation of different wave or impulse characteristics is required in order to effect the functions controlled or governed by the receiving circuit. Other objects of the invention will be set forth in more detail hereinafter.

In the accompanying drawings—

Fig. 1 is a diagrammatic view of a receiving station responsive to electromagnetic waves and having my invention applied thereto; and Fig. 2 is an enlarged detail of one of the relays preferably employed.

The transmitting circuit preferably employed is one having means for transmitting a plurality of contrasting impulses, such as contrasting electromagnetic wave characteristics, as, for example, two or more different wave lengths. For this purpose any suitable means may be employed not herein necessary more fully to describe.

In Fig. 1, I have indicated at 1 the antenna of a wireless-telegraph receiving system. The antenna is connected through the primary coils or windings 2 and 3 of suitable oscillation transformers to earth at 4. The primary coils 2 and 3, when both are included in the open, oscillatory circuit, are, in accordance with my invention, tuned to certain wave characteristics, as, for example, to the long waves or trains of waves transmitted from the sending station. I have represented at 5 and 6 the secondary windings of the oscillation transformers of which the primaries are indicated at 2 and 3 respectively. The said coils or windings 5, 6 are also tuned in resonance with the transmitted waves. The oscillatory circuit is tuned to receiving frequency. The coils 5 and 6 are a portion of the closed, oscillatory circuit or so-called controlling circuit, and are connected by conductor 7. Respectively extending from the said coils or windings 5, 6 are conductors or receptor leads 8, 9. A variable condenser 10 is shunted about the secondary coils or windings 5, 6, being connected to the conductors 8, 9, by conductors 11, 12.

While any suitable detector of electromagnetic waves may be employed in the practice of my invention, I preferably provide one of great sensitiveness and permitting the passage of sufficient current for the purposes more fully hereinafter set forth. Preferably for this purpose I provide a gaseous detector of the so-called audion type and to which I will hereinafter refer as a mercury flash detector. Preferably this consists of an evacuated glass tube or vessel 13. While the degree of vacuum may vary somewhat, it is preferable to pump the vessel to a high vacuum. Supported on a leading-in wire 14, which is sealed through the top of the vessel 13, is an electrode or anode 15, preferably consisting of a disk of platinum or iron. A short distance below the anode 15 is an electrode or grid 16 of suitable construction, not herein necessary more fully to disclose. The grid 16 forms a terminal of the conductor 8. Sealed through the bottom of the vessel 13 is a preferably platinum leading-in wire 17 projecting a short distance into the vessel and terminating in an electrode or cathode 18. Above the platinum wire 17 and supported by a leading-in wire sealed through the side of the vessel is an electrode 19 of any suitable construction, as, for example, a flat circular plate or disk of iron having an axial hole passing therethrough and located preferably directly over the points of the cathode 18. The vessel 13 contains a body of liquid mercury 20, the level of which is preferably normally such that the cathode 18 projects slightly from the surface of the mercury, any suitable means being provided to adjust the level of the mercury 20 to this end. The plate or terminal 19 and the body of mercury 20 form the electrodes or terminals for a mercury arc which is maintained by means of a suitable "keep alive" circuit. Preferably a permanent magnet 21 is placed near to the detector or vessel 13 and having its poles in proper direction with respect to the said detector.

It is not necessary to set forth in detail the operation of the detector 13. Preferably the detector 13 is adjusted to a critical condition and is very sensitive to the received impulses in the so-called controlling circuit or closed, oscillatory circuit. When no received impulses are impressed upon the electrode or grid 16, the current of the controlled circuit does not flow through the vessel 13. When, however, the received impulses are imposed on the said grid, the current of the closed, oscillatory or controlling circuit flows therethrough. When the train of received impulses has ceased, the vessel restores itself to its normal condition of non-current flow, in which case the upper part of the vessel 13 is dark. As soon as the current of the closed, oscillatory or controlling circuit passes through the vessel 13, the latter glows brilliantly, thus giving a visual signal. The mercury arc is believed to produce negative ions or electrons in the vessel 13, and the action of the arc combined with the electromotive force in the closed, oscillatory or controlling circuit, tends to cause a negative current to flow through the tube from the arc to the anode 15.

The conductor 9 preferably leads to a suitable potentiometer 22 from which extends a conductor 23 joined to the leading-in wire 17. The energy of the electromagnetic waves transmitted from the distant control station are imposed upon the grid 16 and the cathode 18 of the detector 13 by circuit from the said grid to the said cathode, thence by conductor 17, 23 to potentiometer 22 to variable condenser 10, and thence to the grid 16.

I preferably employ suitable means for increasing the sensitiveness of the detector 13, and for that purpose may employ a so-called assisting potential circuit. For that purpose, a potential or direct current is preferably imposed upon the grid 16. At 24 is indicated a suitable battery between the positive side of which and the conductor 17 is an ammeter 25. Leading from the potentiometer 22 is a conductor 26 extending to the battery 24 and adjustable with respect thereto, so that any desired strength of current may be placed in the circuit.

In order to increase the sensitiveness of the detector 13, I, in the disclosed embodiment of the invention, superimpose a potential of direct current upon the grid 16 through the circuit from the positive side of the battery 24 to the potentiometer 22 to the secondary coils 6 and 5 of the closed, oscillatory circuit, and thence to the grid. Leading from the terminal 19 is a conductor 27 having a suitable variable resistance 28 and a choke coil 29 preferably of large inductance and primarily used to prevent high frequency surges. The choke coil is connected by conductor 30 with the positive side of the battery 24. The circuit consisting of the detector 13, the variable resistance 28, the choke coil 29, the heating battery 24, the ammeter 25 and the cathode 18 (surrounded by mercury), is employed for the purpose of creating electrons by means of the mercury arc.

Leading from the anode or plate 15 and from the cathode 18 are conductors 31, 32 respectively of a so-called controlled circuit. This circuit is preferably, though not necessarily, one having a periodic current or current characterized by amplitude variation furnished by a comparatively strong local source of electromotive force. Preferably for this purpose I provide an alternating current and have indicated at 33 for this purpose a single-phase, alternating-current, generator. Excellent results have been obtained by the use of a sixty cycle generator of this type. The conductor 31 is in circuit with said generator, and in series therewith is a suitable resistance 34, such as a 25 watt, 110 volt, tungsten lamp, and also an alternating current, slow operating relay 35. The said slow operating relay is employed for the purpose of controlling or governing a circuit indicated by the conductors 36, 37, which themselves control one or more functioning mechanisms, instrumentalities, signals or other parts.

From the alternating generator 33 extends a conductor 38 leading to ground at 39 to prevent surges or local interference reaching the detector, and continued to the contactor or armature 40 of a reversing relay 41 which may be an electromagnet relay of suitable type. The contactor 40 of the relay 41 extends in proximity to the terminals 42, 43 of conductors 44, 45, which extend to a relay having magnets 46, 47. Said relay, which I designate as a wave-changing relay, may be of any suitable character, a single-contact, 10 ohms, alternating-current relay being found effective for the purpose.

The conductor 32 leading from the cathode 18 is connected with the wave-changing relay 46, 47. While within the broad scope and purpose of my invention, other types of current may be employed in the controlled circuit, I preferably provide a periodic current or amplitude variation current and have found effective for this purpose an alternating current as described. An alternating current or amplitude variation current peculiarly cooperates with the gaseous detector 13, and I will set forth briefly a theory of co-action and relation between said controlled circuit and the gaseous detector.

The mercury arc heretofore referred to produces negative ions or electrons in the vessel 13 and the action of the arc combined with the electromotive force in the said controlled circuit, tends to cause a negative current to flow through the vessel 13 from the mercury arc to the anode 15 during those halves of the cycles of electromotive force which maintain the said anode 15 positive with respect to the said mercury arc. The half cycles of the alternating, electromotive force which impress a positive electromotive force upon the anode 15 may be regarded as the positive half cycles and the half cycles which impress a negative electromotive force upon the said anode may be regarded as the negative half cycles. In accordance with the rectifying action of the detector 13, the current flows between the mercury and the anode 15 in one direction only, so that the tendency of the mercury arc and alternating electromotive force is to cause a rectified current to pass through the vessel 13, the negative half cycles being suppressed.

When the vessel 13 is in normal condition and the heating battery 24 is properly adjusted, the gaseous detector is sufficiently non-conducting to prevent negative electrons from the mercury arc from passing to the anode 15 in sufficient quantities to cause an appreciable current to flow through the controlled circuit having the conductors 31, 32. When a positive increment of electromotive force is impressed on the grid 16, the apparent conductivity of the gaseous detector 13 is so increased that the controlled circuit 31, 32 causes a current to flow through the tube during the positive half cycles of the alternating electromotive force. Such positive electromotive force of the grid 16 apparently exerts a sufficient added attraction upon the negative electrons to cause them to pass from the mercury arc to the anode 15. When the electromotive force of the positive half cycle is increased to such a value that with the assistance of the momentary positive charging of the grid 16, the apparent conductivity of the gaseous detector 13 is so increased that the controlled circuit 31, 32, sends a sudden rush of current through the gaseous detector, thereby breaking down its resistance. The current thus started continues to flow until the electromotive force decreases to such a value that it can no longer maintain a current flow through the detector. Apparently when the end of the positive half cycle is nearly reached, the controlled current is suppressed by the action of the mercury arc, and therefore no current flows from the controlled circuit through the gaseous detector during the subsequent negative half cycle. When the next positive half cycle takes place, the current of the controlled circuit 31, 32 again flows through the detector, this action being repeated and the rectified current continuing to flow so long as the waves of electromotive force are impressed upon the grid 16.

Thus the controlling or closed, oscillatory circuit acts as a delicate electrical "trigger" to release a comparatively great store of electrical energy in the controlled circuit 31, 32, which, once released, continues irrespective of the said controlling or closed, oscillatory circuit until it stops of its own accord, when the electromotive force in the said controlled circuit drops to so low a value as no longer to maintain a current flow through the now greatly reduced resistance of the gaseous detector 13. It will thus be understood that the gaseous detector is normally maintained in a critical condition in which a comparatively slight expenditure of energy in the controlling or closed, oscillatory circuit serves to release the current in the controlled circuit 31, 32. The controlled circuit is characterized by a periodic electromotive force which periodically assumes minimum values insufficient of themselves to continue a current flow through the controlled circuit after the expenditure of energy in the controlling circuit has ceased.

In order to cause the operation of the functioning parts or devices only upon the receipt of differently characterized impulses, and thus to prevent or minimize the possibility of interference, I may, in any suitable manner, change the electrical values or constants of the open, oscillatory circuit 1, 2, 3 and of the closed, oscillatory circuit having the coils 5, 6. While to this end the electrical constants may be changed in any suitable manner, as, for example, by changing the inductance or the capacities of the open and closed, oscillatory circuits, I preferably change the inductances thereof and to this end employ the wave changing relay 46, 47.

The contact 48 of the wave-changing relay is adapted to be acted upon by either electromagnet 46 or 47 of the said relay. When the electromagnet 47 is energized by contact of the terminal 42 with the contact 40, then the said contact 48 engages the terminal 49, thus closing a circuit having conductors 50, 51 leading from the said contact 48 and terminal 49. The said circuit, which, for convenience of description, may be termed the wave-changing circuit, is provided with a local battery 52 or other source of energy, a fixed condenser 53 and a condenser 54 provided to prevent arcing at the contacts and surgings back into the gaseous detector of currents set up by rapid movement of the armature of the relay.

The said wave changing circuit has therein the said reversing relay 41 and the armature or contact 40 thereof is provided with a spring 55, by means of which the said armature may be drawn into contact with the terminal 42 upon de-energization of the said relay 41. Leading from the battery 52 and from the reversing relay 41 respectively are conductors 56, 57, one of which is preferably provided with a switch 58. The conductors 56, 57 extend to a relay 59 of any suitable character, such, for example, as a four contact, 10 ohms relay, shown most clearly in Fig. 2. The armature 60 thereof is provided with insulating portions 61, 62. The former supports the terminal 63 of a conductor 64 leading to the aerial circuit to which it is connected at 65. Positioned in such proximity to the terminal 63 that it may make contact therewith when the relay 59 is de-energized, is a terminal 66 of a conductor 67 leading to and connected to the aerial circuit at 68. Similarly, the insulated portion 62 supports a terminal 69 leading from which is a conductor 70 connected to the closed, oscillatory or controlling circuit at 71. In sufficient proximity to the terminal 69 to be engaged thereby when the relay 59 is de-energized is a terminal 72 of a conductor 73, which extends to and is connected to the closed, oscillatory or controlling circuit at 74. A spring 75 is employed to move the terminal 63, 69 respectively into contact with the terminals 66, 72. Upon energization of the relay 59, the contacts 63, 66 and 69, 72 will be separated.

When contact is established between the terminals 63, 66 and 69, 72 respectively, the inductances 2, 5 are respectively cut out of the aerial circuit and the closed, oscillatory circuit, which are then responsive only to the short waves transmitted from the control station. When, however, the relay 59 is energized, then contact is broken at the terminals 63, 66 and 69, 72 respectively, so that the inductances 2 and 5 are brought into the said aerial circuit and the closed oscillatory circuits respectively, which are then responsive to the long waves transmitted from the control station.

From the construction of the wave-changing circuit, it will be evident that when contact is established between the contact or armature 40 of the relay 41 and the terminal 42, the electromagnet 47 is energized, thus attracting the armature 48 which makes contact with the terminal 49, thereby energizing the relay 59 and in the manner previously described throwing the inductances 2 and 5 into the aerial circuit and the closed, oscillatory circuit, respectively, thus rendering the same responsive to the long waves transmitted from the control station. At the same time, the relay 41 is energized and the armature or contact 40 thereof is attracted and drawn into contact with the terminal 43, whereby the electromagnet 46 is energized, thus withdrawing the armature 48 from the terminal 49 and causing the de-energization of the relay 41 and the relay 59. Thereupon the spring 75 withdraws the armature 60 into such position that in the manner described the inductances 2 and 5 are cut out from the aerial circuit and the closed, oscillatory circuit, respectively, which are now responsive only to the short waves. At the same time, the armature 40 makes contact with the terminal 43, and the cycle of operations is repeated. The condenser 10 is set at a proper value for both wave lengths.

The relay 35, is, as stated, the control operating relay and its operation of closing contacts is slow, so that the said relay will operate only on a periodic number of impulses, as from two different wave lengths, due to the change from one to the other, while a single impulse would only change the system to the other wave length without effecting control of the functioning apparatus.

Assuming that the apparatus is tuned for long length waves, if an enemy should transmit the proper length long wave, the first of the train thereof will at once in the manner described alter the inductance of the aerial circuit and the closed, oscillatory circuit, so that they are instantly tuned for the short waves. Hence the balance of the train of long waves can have no effect, and the enemy, not knowing the short wave length, can no longer act upon the aerial circuit and the closed, oscillatory circuit, and hence the slow operating relay 35 cannot be operated.

In the proper operation and when impulses are sent from a friendly control station, the long and short waves are transmitted simultaneously. If the circuit be tuned for the long waves, the first of the train of such long waves changes the tuning so as to render the circuit responsive to the short waves, then one of the train of short waves acts and at once changes the system back into resonance with the long waves, this action being repeated a number of times. The described rapid change causes and is essential to the operation of the slow operating relay 35.

If a direct current be employed in place of the periodic or alternating current referred to and which may be done within the broad scope and purpose of my invention, suitable change in the construction of the relays may be made.

By the employment of the permanent magnet 21, the sensitiveness and reliability of the gaseous detector may be increased, and this permits the assisting potential current that is imposed upon the grid to be increased to a point nearer the break-down or critical point of the detector's sensitiveness.

Having thus described one illustrative embodiment of my invention, I desire it to be understood that although specific terms are employed, they are used in a generic and descriptive sense and not for purposes of limitation, the scope of the invention being set forth in the following claims.

Claims:

1. That method of utilizing radiant energy which comprises transmitting electromagnetic waves of different lengths to an aerial circuit and a closed, oscillatory circuit, controlling an alternating current by impulses impressed upon said aerial and closed, oscillatory circuits, causing changes in the electrical constants of said aerial and closed, oscillatory circuits by said alternating current, and operating a part as a result of said changes in the electrical constants of said aerial and closed, oscillatory circuits.

2. That method of utilizing radiant energy which comprises transmitting electromagnetic waves having contrasting characteristics to an aerial circuit and a closed, oscillatory circuit, governing a periodic current by said circuits, and causing changes in the electrical constants of said circuits through the agency of said periodic current.

3. That method of utilizing radiant energy which comprises transmitting electromagnetic waves having contrasting characteristics to an aerial circuit and a closed, oscillatory circuit, governing a periodic current by said circuits, causing changes in the electrical constants of said currents through the agency of said periodic current, and operating a part as a result of the action of said changes in the electrical constants of said currents.

4. That method of utilizing radiant energy which comprises transmitting electromagnetic waves having contrasting characteristics to an aerial circuit and a closed, oscillatory circuit, causing pulsating changes in the electrical constants of said circuits by the alternating supplanting action of said electro-magnetic waves, respectively, and causing the operation of a device as a result of said pulsating changes in said electrical constants.

5. That method of utilizing radiant energy which comprises transmitting electromagnetic waves having contrasting characteristics to an aerial circuit and a closed, oscillatory circuit, and causing changes with a periodic current in the electrical constants of said aerial and closed, oscillatory circuits, by the alternating supplanting action of said electromagnetic waves, respectively.

6. That method of utilizing radiant energy which comprises transmitting electromagnetic waves having contrasting characteristics to an aerial circuit and a closed, oscillatory circuit, causing changes by a periodic current in the electrical constants of said aerial and closed, oscillatory circuits, by the alternating supplanting action of said electro-magnetic waves, respectively, and causing the operation of a device as a result of said changes in the electrical constants of said aerial and closed, oscillatory circuits.

7. A system for utilizing radiant energy comprising an aerial circuit, a closed, oscillatory circuit having a detector, a circuit controlled thereby, and means governed by said controlled circuit to change the electrical constants of said aerial and oscillatory circuits, by the alternating supplanting action of a plurality of trains of said energy respectively, in said oscillatory circuit, said controlled circuit including a device operated only by a plurality of successive periodic changes in the constants of said aerial and oscillatory circuits.

8. A system for utilizing radiant energy comprising an aerial circuit, a closed, oscillatory circuit having a detector, a circuit controlled by the latter, means governed by said controlled circuit for causing periodic changes in the electrical constants of said aerial and closed, oscillatory circuits, by the alternating supplanting action of a plurality of trains of said energy, respectively, in said oscillatory circuit, and a relay operated by the cooperating periodic changes in said electrical values of said circuits.

9. A system for utilizing radiant energy comprising an open aerial circuit, a closed, oscillatory circuit having a detector, and alternating current circuit controlled by said detector, means governed by said controlled circuit to change the electrical constants of said aerial and closed, oscillatory circuits, by the alternating supplanting action of a plurality of trains of said energy, respectively, in said oscillatory circuit, and a relay rendered operative only by the successive changes in the electrical constants of said aerial and closed, oscillatory circuits.

10. A system for utilizing radiant energy comprising an aerial circuit, a closed, oscillatory circuit having a detector, an alternating current circuit controlled by said detector, means governed by said controlled circuit for changing the electrical constants of said aerial and closed, oscillatory circuits, and a slow-operating relay in said alternating current circuit.

11. A system for utilizing radiant energy comprising, in combination, an aerial circuit, a closed, oscillatory circuit having a detector, a circuit controlled by said detector, means governed by said controlled circuit for changing the electrical constants of said aerial and closed-oscillatory circuits and a slow-operating relay controlled by said controlled circuit.

12. A system for utilizing radiant energy comprising an open aerial circuit, a closed, oscillatory circuit having a detector, an alternating current circuit controlled by said detector, means governed by said alternating current circuit for periodically changing the electrical constants of said aerial and closed, oscillatory circuits, and a slow-operating relay rendered effective by the said periodic changes in the said electrical constants.

13. A system for utilizing radiant energy comprising in combination, an open, aerial circuit, a closed, oscillatory circuit, and means controlled by said circuits to cause pulsating changes in the electrical constants of said circuits whenever the said circuits are continuously energized for an appreciable length of time.

14. A system for utilizing radiant energy comprising an aerial circuit, a closed, oscillatory circuit, a circuit controlled by the closed, oscillatory circuit, and a relay controlled by said controlled circuit to change the electrical constants of said aerial and closed, oscillatory circuits whenever the said circuits are continuously energized for an appreciable length of time.

15. A system for utilizing radiant energy comprising an aerial circuit, a closed, oscillatory circuit, a circuit controlled by the closed, oscillatory circuit, a relay controlled by said controlled circuit, and means operated by said relay to change the inductance of said aerial and closed, oscillatory circuits whenever the said circuits are continuously energized for an appreciable length of time.

16. A system for utilizing radiant energy comprising an aerial circuit, a closed, oscillatory circuit having a detector, a circuit controlled by said detector, and a circuit having a relay constructed and arranged to cause changes in the electrical constants of said aerial circuit and said closed, oscillatory circuit whenever the said circuits are continuously energized for an appreciable length of time.

17. A system for utilizing radiant energy comprising an open aerial circuit, a closed, oscillatory circuit having a detector, a circuit controlled by said detector, a circuit governed by said controlled circuit, and a relay in the governed circuit constructed and arranged to cause changes in the inductance of said aerial and closed, oscillatory circuits whenever the said circuits are continuously energized for an appreciable length of time.

18. A system for utilizing radiant energy comprising an open, aerial circuit, a closed, oscillatory circuit having a detector, a circuit controlled by said detector and having a wave changing relay, a wave-changing circuit governed by said relay and having a relay to effect changes in the electrical constants of said aerial and closed, oscillatory circuits, and a device operated as a result of the changes in the electrical constants of said aerial and closed, oscillatory circuits.

19. A system for utilizing radiant energy comprising an open, aerial circuit, a closed, oscillatory circuit having a detector, a circuit controlled by the detector and having a wave-changing relay, a wave changing circuit controlled by said relay and having a reversing relay and a relay constructed and arranged to cause changes in the electrical constants of the aerial circuit and closed, oscillatory circuit whenever the said circuits are continuously energized for an appreciable length of time.

20. A system for utilizing radiant energy comprising in combination, an aerial circuit, a closed, oscillatory circuit having a detector, a circuit controlled by said detector and having a wave-changing relay, a wave-changing circuit governed by said relay and provided with a reversing relay, and a relay constructed and arranged to cause changes in the electrical constants of said aerial circuit and closed, oscillatory circuit, and a device operated as a result of said changes in the electrical constants of said aerial and closed, oscillatory circuits.

21. A system for utilizing radiant energy comprising in combination, an open, aerial circuit, a closed, oscillatory circuit having a detector, an alternating current circuit controlled by said detector and having a wave-changing relay, a wave-changing circuit controlled by said relay and having a reversing relay, a relay constructed and arranged to cause changes in the inductance of said aerial and closed, oscillatory circuits, and a device in said alternating current circuit operated by the changes in the inductance of said aerial and closed, oscillatory circuits.

22. A system for utilizing radiant energy comprising an aerial circuit, a closed, oscillatory circuit having a detector, a periodic current circuit controlled by said detector, a relay governed by said periodic current circuit to effect changes in the inductance of said aerial and closed, oscillatory circuits, and a slow operating relay in said periodic current circuit operated as a result of periodic changes in the inductance of said aerial and closed, oscillatory circuits.

23. The combination with means for transmitting waves, comprising a plurality of series of regular periodic variations having different frequencies respectively, of tuned receiving means including means arranged to be actuated as a result of the action of said waves to change the tuning of said receiving means to cause it to be tuned successively and repeatedly to said frequencies whenever said receiving means is automatically exposed for a predetermined time to the action of said waves having said periodic variations of different frequencies respectively.

24. The combination with means for transmitting electro-radiant waves, comprising a plurality of series of periodic variations having different frequencies respectively, of receiving means including an element tuned when in operation to respond to one of said frequencies, and means arranged to be controlled by said transmitting means to change the tuning of said element periodically to cause said element to be tuned successively and repeatedly to said frequencies respectively, whenever said receiving means is continuously exposed for a predetermined time to the action of said waves having said periodic variations of different frequencies respectively.

25. The combination with means for transmitting electro-radiant waves, comprising a plurality of series of periodic variations having different frequencies respectively, of receiving means including an element electrically tuned when in operation to respond to one of said frequencies, and means arranged to be controlled by said transmitting means to change the tuning of said element periodically to cause said element to be tuned successively and repeatedly to said frequencies respectively whenever said receiving means is continuously exposed for a predetermined time to the action of said waves having said periodic variations of different frequencies respectively.

26. A receiving system for energy in the form of waves including means controlled by waves received by the system for tuning said system successively and repeatedly to a plurality of different frequencies whenever said system is exposed to the influence of suitable waves, including a plurality of series of periodic variations having frequencies corresponding to said plurality of frequencies respectively.

27. A receiving system for radiant energy of duplex wave form comprising an open aerial circuit, a closed oscillatory circuit coupled thereto, means for tuning the closed oscillatory circuit to a predetermined frequency, means for modifying each of said circuits simultaneously so as to be responsive to a different frequency, and means actuated by the received radiant energy for intermittently controlling said modifying means.

Signed at Gloucester, in the county of Essex and State of Massachusetts, this ninth day of July A. D. 1915.

JOHN HAYS HAMMOND, Jr.

Witnesses:
WILLIAM E. KERR,
JOHN CUNNINGHAM.